United States Patent
Koch

(10) Patent No.: US 6,578,561 B1
(45) Date of Patent: Jun. 17, 2003

(54) COMPRESSOR FOR AN INTERNAL COMBUSTION ENGINE OF A MOTOR VEHICLE

(75) Inventor: Adolf Koch, Waiblingen (DE)

(73) Assignee: Sport-Service-Lorinser Sportliche Autoausrüstung GmbH, Waiblingen (DE)

(*) Notice: Subject to any disclaimer, the term of this patent is extended or adjusted under 35 U.S.C. 154(b) by 0 days.

(21) Appl. No.: 09/856,794

(22) PCT Filed: Nov. 22, 1999

(86) PCT No.: PCT/EP99/08902
§ 371 (c)(1),
(2), (4) Date: Aug. 8, 2001

(87) PCT Pub. No.: WO00/31393
PCT Pub. Date: Jun. 2, 2000

(30) Foreign Application Priority Data

Nov. 24, 1998 (DE) .................................. 298 20 921 U
Dec. 4, 1998 (DE) .................................. 298 21 559 U

(51) Int. Cl.⁷ .................................................. F02B 33/00
(52) U.S. Cl. ................. 123/559.3; 477/174; 474/171
(58) Field of Search ........................ 123/561, 559.3; 474/177, 171; 477/174, 32; 192/FOR 100

(56) References Cited

U.S. PATENT DOCUMENTS

| 4,004,335 A | | 1/1977 | Pierce et al. ............... 474/171 |
| 4,290,295 A | * | 9/1981 | Kanamaru et al. .......... 474/171 |
| 4,596,225 A | * | 6/1986 | Oonaka et al. ........... 123/559.3 |
| 4,660,526 A | * | 4/1987 | Horii ...................... 123/559.3 |
| 4,708,119 A | | 11/1987 | Miyake ................... 123/559.3 |
| 5,125,292 A | * | 6/1992 | Matsuoka et al. ......... 123/559.3 |
| 5,133,326 A | | 7/1992 | Nishimura et al. ........ 123/559.3 |
| 6,289,882 B1 | * | 9/2001 | Slicker ................... 123/559.3 |
| 2002/0006848 A1 | * | 1/2002 | Tabata ........................ 477/174 |

FOREIGN PATENT DOCUMENTS

| EP | 0 392 330 | 10/1990 | ............. 123/559.3 |
| GB | 2 155 565 | 9/1985 | ........ 192/FOR 100 |

OTHER PUBLICATIONS

58225231, Patent Abstracts of Japan, vol. 008, No. 080, Apr. 12, 1984.

* cited by examiner

Primary Examiner—Thomas Denion
Assistant Examiner—Thai Ba Trieu
(74) Attorney, Agent, or Firm—Collard & Roe, P.C.

(57) ABSTRACT

The invention relates to a compressor (1) for an internal combustion engine of a motor vehicle, comprising an input shaft (2) which drives the compressor (2) and via a switchable electromagnetic clutch can be coupled to a pulley (10) which can be driven by the internal combustion engine. The clutch comprises a friction surface (10') which is positioned at the face end of the pulley (10), a disk carrier (12) mounted in a non-rotating manner on the input shaft (2) and an annular magnet or toroidal coil system (6) housed in an annular gap (11) or annular recess of the pulley (10) for pressing a disk (15) mounted in a non-rotating manner on the disk carrier (12) against the friction surface (10'). A sleeve (8) is mounted in a non-rotating manner on the input shaft (2), the pulley (10) is rotationally mounted on the sleeve (8) and the disk carrier (12) is flanged to the face end of the sleeve (8).

9 Claims, 1 Drawing Sheet

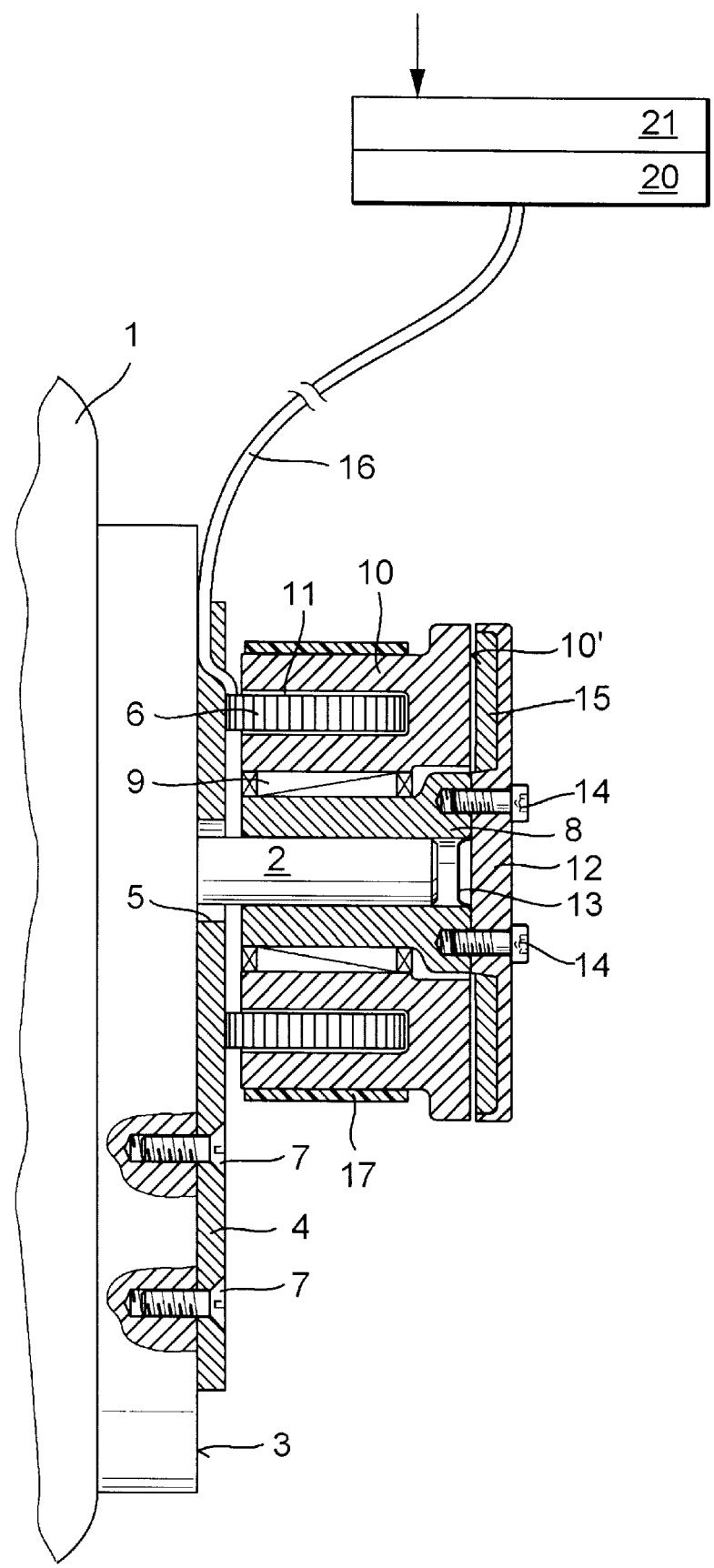

COMPRESSOR FOR AN INTERNAL COMBUSTION ENGINE OF A MOTOR VEHICLE

CROSS REFERENCE TO RELATED APPLICATIONS

Applicants claim priority under 35 U.S.C. §119 of German Application Nos. 298 20 921.7 and 298 21 559.4, filed on Nov. 24, 1998 and Dec. 24, 1998, respectively. Applicants also claim priority under 35 U.S.C. §120 of PCT/EP99/08902, filed on Nov. 22, 1999. The international application under PCT article 21(2) was not published in English.

The invention relates to a supercharger for a combustion engine of a motor vehicle, with a supercharger-driving input shaft that can be linked with a pulley drivable by the combustion engine via a switchable electromagnetic clutch, which has a frictional surface arranged on the front of the pulley, as well as a multi-plate carrier non-rotationally secured to the input shaft and a ring magnet or ring coil device accommodated in an annular slit in the pulley used to press a plate non-rotationally secured to the multi-plate carrier against the frictional surface.

The combustion engines in some passenger vehicles come standard with these superchargers. Correctly controlling the electromagnetic clutch here ensures that the supercharger only operates when the combustion engine is working at higher RPM's and/or against a heavy load or strongly accelerated.

This makes it possible to ensure a good operating performance for the engine when driving slowly, in particular while driving in the city with a lot of stop-and-go action. In addition, the motor responds with a clearly stronger, instant acceleration when correspondingly depressing the accelerator pedal.

In addition, it is possible to have the combustion engine continuously drive the supercharger. In this case, it is standard for the air conveyed from the supercharger to first be routed to the inlet side of the engine only above an engine speed threshold, i.e., the engine works strictly as a naturally aspirated engine under this engine speed threshold. As a result, the stream of air generated by the supercharger at low engine speeds is prevented from having an undesired impact on the engine control electronics currently in use, since the sensors used to detect the aspirated stream of air can be affected, and the throttle valve in the aspiration system that is often nearly closed at low engine speeds can be undesirably moved by the stream of air from the supercharger.

The air stream generated by the supercharger is routed away via corresponding valves or air flap devices, through which the supercharger air stream can be released to the outside or relayed to the engine.

It is basically possible to retrofit motor vehicle engines with superchargers to increase the available power. However, superchargers for retrofitting are routinely not designed for combination with an electromagnetic clutch. Rather, it is assumed that the engine can continuously drive the supercharger without interruption.

However, in contemporary engines with the aforementioned electronic engine control, this has undesired effects on the sensor technology in the engine control.

Therefore, the object of the invention is to provide a way in which to retrofit a supercharger designed for uninterrupted operation with an electromagnetic clutch, or control the clutch.

This object is achieved according to the invention by securing a sleeve non-rotationally to the input shaft, pivoting the pulley to the sleeve, and flanging the multi-plate carrier to the front of the sleeve.

The invention is based on the general idea of using the input shaft of the superchargers for mounting the multi-plate carrier non-rotationally relative to the input shaft, and for mounting the pulley rotationally relative to the input shaft, and hence for holding the input and output of the electromagnetic clutch. This eliminates the need for stationary bearing parts for the pulley. At the same time, the multi-plate carrier and pulley can be centered relative to each other without any noteworthy structural outlay.

In a preferred embodiment of the invention, a flange plate that carries the fixed ring magnet or ring coil device and has an opening penetrated by the input shaft and situated inside the ring magnet or ring coil device is secured to a flange surface on the supercharger casing from which the input shaft projects.

In this way, the ring magnet or ring coil device can be fixed in place, eliminating the need for sliding contacts or the like for power supply.

The connecting cables of the ring magnet or ring coil device are preferably accommodated and protected in a recess formed in the flange plate, in particular a groove, which can be arranged on the side of the flange plate facing the supercharger casing in a particularly expedient embodiment of the invention, so that the aforementioned cables are accommodated in a channel enveloped by the supercharger and flange plate after assembly of the flange plate.

The switchable clutch is actuated according to the invention from a control system, which only permits closing of the clutch at above a combustion engine speed threshold, or above a parameter correlated with the aforementioned speed, and allows the clutch to first run through a prescribed slip phase on closing.

In this case, the general idea of providing a switchable clutch with controllable clutch moment, i.e., with controllable transferable moment, between the supercharger and combustion engine is realized. This places only a moderate load on the combustion engine and supercharger as well as the drive connection between the engine and supercharger on closing of the clutch. In particular undesired load peaks are avoided, so that the drive connection can exhibit a comparatively simple structure, and neither the bearings for the moveable compressor elements of the supercharger nor the bearings of the supercharger-driving engine elements, e.g., camshaft, need not be reinforced.

In a particularly preferred embodiment of the invention, al electromagnetic clutch is provided, wherein the controller changes an electrical clutch current with delays or in multiple stages while engaging the clutch.

This ensures a good controllability for the clutch.

With respect to preferred features of the invention, reference is otherwise made to the claims and following explanation of the drawing, based upon which an especially preferred embodiment of the invention is described.

In this case, the sole FIGURE shows a diagrammatic axial section of the pulley and electromagnetic clutch on the input shaft of the supercharger.

In the drawing, a supercharger accommodated in the engine compartment of a motor vehicle (not shown in any greater detail) has an only partially depicted supercharger casing 1, as well as a supercharger-driving input shaft 2, which projects out of a flange surface 3 formed on the supercharger casing 1.

Secured, especially bolted, to the flange surface 3 is a flange plate 4, which has an opening 5 penetrated by the input shaft 2, and on which a ring magnet or ring coil device 6 is rigidly mounted. To position the ring magnet or ring coil device 6 exactly centrally to the axis of the input shaft 2, the location holes for the fastening screws 7 of the flange plate 4 and the corresponding attachment hole in the flange surface 3 are laid out with the corresponding level of precision.

A sleeve 8 is secured to the input shaft 2 in a non-rotational and axially fixed manner. Held on the outside periphery of this sleeve 8 are one or more roller bearings 9 for the axial and radial mounting of a pulley 10, which is correspondingly pivoted to the sleeve 8 in a smooth running manner, and can hence rotate relative to the input shaft 2. This pulley has a ring slit 11 open to the supercharger casing 1 and concentric to the axis of the input shaft 2; it accommodates the ring magnet or ring coil device 6 while leaving open narrow air gaps.

The front end of the sleeve 8 removed from the supercharger casing 1 is designed as a flange, to which a multi-plate carrier 12 is flanged. For purposes of centering relative to the sleeve 8, the multi-plate carrier 12 can have an axial extension 13 that can be inserted without clearance into the axial borehole of the sleeve 8. Otherwise, the multi-plate carrier 12 can be secured to the sleeve 8 with screws 14 arranged in a circular pattern.

On its side facing the pulley 10, the multi-plate carrier 12 carries a ring wheel-like plate 15 that cannot rotate relative to the multi-plate carrier 12, but can be shifted axially against a restoring force, wherein this plate interacts with a frictional surface 10' on the ring wheel-like front side of the pulley 10 facing the multi-plate carrier 12.

When an electrical current is passed through the ring magnet or ring coil device 6, the plate 15 is pressed against the frictional surface 10' of the pulley 10 by magnetic forces against restoring forces that try and draw the plate 15 (to the right in the drawing) toward the multi-plate carrier 12, so that a strong frictional connection arises between the frictional surface 10' and plate 15, and the pulley 10 is hence frictionally engaged with the input shaft 2.

The plate 15 consists of a readily magnetizable material, so that the plate 15 can be magnetically controlled by the ring magnet or ring coil device 6. Readily magnetizable press-on bodies can be fixed to the plate 15 instead. Otherwise, the pulley 10 can also consist of a readily magnetizable material, in particular an iron material, so that the pulley 10, when an electrical current is supplied to the ring magnet or ring coil device 6, forms a strongly magnetized core of this device, and effectively draws in the magnetizable plate 15 or its magnetizable press-on bodies.

A current is supplied to the ring magnet or ring coil device 6 through a cable 16, which is preferably accommodated in a groove formed on the side of the flange plate 4 facing the flange surface 3, and abuts a borehole on the ring magnet or ring coil device 6 that intersects the flange plate 4. This makes it possible to route the cable 16 from the ring magnet or ring coil device 6 on the side of the flange plate 4 facing away from the pulley 10, and accommodate it there in a cable channel enveloped by the flange plate 4 and flange surface 3.

If necessary, the groove provided to form the cable channel can be wholly or partially provided in the flange surface 3 of the supercharger casing 1.

The pulley 10 is looped by a transmission belt 17, which otherwise runs over an additional pulley (not shown) continuously driven by the vehicle engine. Consequently, the pulley 10 is continuously driven with the motor vehicle in operation, while the supercharger only works when a current is supplied to the ring magnet or ring coil device 6 during engine operation via the cable 16, and hence the pulley 10 is non-positively coupled via the plate 15 with the sleeve 8, and hence with the input shaft 2 of the supercharger.

Correctly supplying current to the ring magnet or ring coil device 6 enables supercharger operation that reflects demand. In particular, it can be ensured that the supercharger only operates when this can occur without any disruptive impact on engine control, or is desired based on a high power demand on the vehicle engine.

To supply the ring magnet or ring coil device 6, the cable 16 is connected with an electrical driver stage 20, which in turn is activated by an electronic control circuit, and can be integrated with the control circuit 21.

The input side of the control circuit 21 receives signals from sensors (not shown) or a timing gear (also not shown) that reflect the engine speed and are correlated thereto.

As soon as the engine speed exceeds a first threshold, the ring magnet or ring coil device 6 is supplied with an electrical current. This current is supplied in two stages, in such a way that a limited clutch moment is generated for a prescribed. delay period, and the clutch works with a corresponding slip. The current supply is then increased, so that a high clutch moment is generated, and the clutch thereafter works without slip.

This ensures that the supercharger undergoes "soft" acceleration on closing the clutch, and the engine-side drive elements of the supercharger, e.g., an engine camshaft, are placed under a corresponding low load, in particular without jerking.

As soon as the engine speed has dipped below another threshold lying under the previously mentioned engine speed threshold, the clutch is opened again, wherein the clutch can also run through a slip phase by having the controller 21 effect a controlled reduction in the clutch current supplied by the driver stage 20, so as to "slowly" reduce the load on the engine by the supercharger drive.

If necessary, the clutch current can be increased or decreased in multiple stages or continuously when opening and/or closing the clutch.

What is claimed is:

1. A supercharger on the input side of a combustion engine of a motor vehicle comprising:
    a drive connection having a switchable clutch disposed between the combustion engine and the supercharger;
    an engine speed detector for detecting the speed of the combustion engine; and
    a controller in communication with said engine speed detector, wherein said controller controls said switchable clutch in dependence of said combustion engine speed;
    wherein, in a first mode, said controller closes said switchable clutch only above a first threshold value of said combustion engine speed, wherein said clutch initially passes through a prescribed slip phase during closing; and
    wherein, in a second mode, said controller opens said switchable clutch below a second threshold value of said combustion engine speed, wherein said second threshold value is smaller than said first threshold value.

2. The supercharger according to claim 1, further comprising an electromagnetic clutch, and wherein said controller changes an electrical clutch current in accordance with at least one of the following: with a delay and in multiple stages during coupling.

3. The supercharger according to claim 2, wherein said clutch current is reduced in accordance with at least one of the following: with a delay and in multiple stages while opening the clutch.

4. The supercharger according to claim 1, wherein said drive connection and said switchable clutch comprise:

a supercharger-driving input shaft;

a pulley linked to said supercharger-driving input shaft and having a frictional surface arranged on a front side of said pulley as well as an annular slit or annular recess, wherein said pulley is drivable by the combustion engine via said switchable electromagnetic clutch;

a sleeve non-rotationally secured to said input shaft to which said pulley is pivoted;

a multi-plate carrier non-rotationally secured to said input shaft and flanged to a front of said sleeve;

a plate non-rotationally secured to said multi-plate carrier pushed against said frictional surface of said pulley; and a ring magnet or ring coil device accommodated in said annular slit or an annular recess in said pulley, wherein said ring magnet or ring coil presses said place against said frictional surface.

5. The supercharger according to claim 4, further comprising a flange plate that carries said ring magnet or ring coil device, wherein said flange plate has an opening penetrated by said input shaft and disposed inside said ring magnet or ring coil device; and a flange surface on the supercharger casing from which said input shaft projects and to which said flange plate is secured.

6. The supercharger according to claim 5, further comprising a groove or channel in said flange plate for holding a connecting cable of said ring magnet or ring coil device.

7. The supercharger according to claim 6, wherein said groove or channel is formed on a side of said flange plate facing the supercharger casing.

8. The supercharger according to claim 1, wherein said engine speed detector comprises a timing gear coupled to the combustion engine.

9. A method of engaging and disengaging a supercharger that is coupled to a combustion engine, comprising the steps of:

providing a drive connection having a switchable clutch disposed between the combustion engine and the supercharger;

detecting engine speed with an engine speed detector;

closing said switchable clutch above a first threshold value of said combustion engine speed, wherein said clutch initially passes through a prescribed slip phase during closing; and opening said switchable clutch below a second threshold value of said combustion engine speed, wherein said second threshold value is smaller than said first threshold value.

* * * * *